(12) United States Patent
Fages et al.

(10) Patent No.: US 11,464,221 B2
(45) Date of Patent: Oct. 11, 2022

(54) ANIMAL TRAP DETECTION SYSTEM USING A GLUE BOARD

(71) Applicant: Bayer CropScience LP, St. Louis, MO (US)

(72) Inventors: Gaelle Fages, Chapel Hill, NC (US); Byron Reid, Raleigh, NC (US); Homare Teramoto, Chiba (JP); Fabien Pelissier, Toda (JP)

(73) Assignee: BAYER CROPSCIENCE LP, St. Louis, MO (US)

( * ) Notice: Subject to any disclaimer, the term of this patent is extended or adjusted under 35 U.S.C. 154(b) by 186 days.

(21) Appl. No.: 16/774,840

(22) Filed: Jan. 28, 2020

(65) Prior Publication Data

US 2020/0236920 A1 Jul. 30, 2020

Related U.S. Application Data

(60) Provisional application No. 62/798,538, filed on Jan. 30, 2019.

(51) Int. Cl.
```
A01M 23/00    (2006.01)
A01M 1/02     (2006.01)
A01M 1/14     (2006.01)
G01P 15/18    (2013.01)
H04L 12/18    (2006.01)
```
(52) U.S. Cl.
CPC .......... *A01M 23/005* (2013.01); *A01M 1/026* (2013.01); *A01M 1/14* (2013.01); *G01P 15/18* (2013.01); *H04L 12/1895* (2013.01)

(58) Field of Classification Search
None
See application file for complete search history.

(56) References Cited

U.S. PATENT DOCUMENTS

| | | |
|---|---|---|
| 6,775,946 B2 | 8/2004 | Wright |
| 8,418,396 B2 | 4/2013 | Moustirats |
| 9,380,775 B2 | 7/2016 | Frojmovics |

(Continued)

FOREIGN PATENT DOCUMENTS

JP       20181533107 A    10/2018

OTHER PUBLICATIONS

International Search Report for Application for PCT/US2020/015460 dated Jun. 4, 2020.

*Primary Examiner* — Douglas X Rodriguez
*Assistant Examiner* — Carl F. R. Tchatchouang
(74) *Attorney, Agent, or Firm* — McBee Moore & Vanik IP, LLC (57) ABSTRACT

An animal trap system includes a glue board, an animal trap accelerometer sensor, and a signal unit in close proximity to and in communications with the animal trap accelerometer sensor, wherein the signal unit also contains an accelerometer sensor. The animal trap system is capable of detecting capture events, non-capture events, false positives, and/or the type of animal captured by using differential signal analysis and machine learning techniques. When an acceleration is received by the animal trap accelerometer sensor above a pre-set acceleration threshold value, it sends a capture signal to the signal unit and if the signal unit does not receive such acceleration event, the signal unit transmits a capture signal to an off-site receiver. A method of trapping one or more animals using this system is also provided.

13 Claims, 5 Drawing Sheets

(56) References Cited

U.S. PATENT DOCUMENTS

| | | | |
|---|---|---|---|
| 2004/0020100 A1 | 2/2004 | O'Brien et al. | |
| 2004/0177791 A1* | 9/2004 | Lawson | A01M 1/026 |
| | | | 108/51.11 |
| 2009/0151221 A1 | 6/2009 | Daley | |
| 2009/0223112 A1* | 9/2009 | Deibert | A01M 23/38 |
| | | | 43/99 |
| 2010/0024278 A1* | 2/2010 | Simchoni-Barak | A01M 1/023 |
| | | | 43/113 |
| 2011/0083358 A1 | 4/2011 | Slotnick | |
| 2011/0138676 A1 | 6/2011 | Moustirats | |
| 2013/0342344 A1 | 12/2013 | Kramer et al. | |
| 2016/0338337 A1* | 11/2016 | Waldman | A01M 29/18 |
| 2018/0249696 A1 | 9/2018 | Daly et al. | |
| 2019/0037829 A1* | 2/2019 | Laut | B01F 7/00725 |

* cited by examiner

ANIMAL TRAP DETECTION SYSTEM USING A GLUE BOARD

CROSS REFERENCE TO RELATED APPLICATIONS

This application claims the benefit of U.S. Provisional Application Ser. No. 62/798,538, filed Jan. 30, 2019, the contents of which are herein incorporated by reference in their entirety.

BACKGROUND OF INVENTION

Field of the Invention

The invention relates generally to the field of animal trap systems. More specifically, the invention relates to animal trap detection systems that include a glue board. The present application also relates to wireless reporting of events and more particularly to wireless reporting of status of animal traps.

Background Art

Animal traps have been in use for years, and the majority of these devices use either a glue board, spring load, or live trap device. Animal traps are frequently placed in many locations and may also be moved about as needs arise. While these devices may be suitable for easy to monitor locations, they are not suitable for remote hard to monitor locations. One problem with these conventional traps is that they are often placed, for example, in an attic in a house, and there is no easy way of knowing when the trap is activated other than by viewing them. Another problem with the standard glue board and spring-loaded traps are that an animal(s) is often left for extended periods of time to the point that they begin to decay attracting even more animals.

Further, an individual ordinarily must remember where each trap has been placed and frequently check the traps visually to see whether they have captured an animal(s). The task of trap checking is made even more critical in certain sensitive establishments (e.g., commercial food) or for wildlife (e.g., raccoon, squirrels, nutria species) where prevailing laws invoke penalties if an animal(s) has been trapped for too long a period of time.

To date, animal trap activation detection systems have been able to provide basic on/off alert information to users with very limited and narrow applications. Examples of this include a spring-loaded trap that sounds a local audio signal when activated. While this attempts to solve the problem of alerting that a remote trap has been activated, it does not solve the fundamental problem if the trap is a considerable distance from the trap user. In addition, the battery operated audio device has the disadvantage of causing the battery to run down. Another type of alert system uses sophisticated and expensive sensing techniques, such as infrared or motion sensors, which alert the trap user once a trap activation has been detected. Still other alert systems use various imaging systems to report the presence of an animal(s) in a trap, however, transmitting of digital images has a high bandwidth and energy demands. The expense and sophistication of these devices may limit their use in a high volume low-tech field, such as pest control. In general, these prior approaches are too expensive, too sophisticated, and have a narrow scope of application.

US 2013/0342344 discloses an animal trap system, which utilizes a single digital accelerometer to provide an alert of whether an animal trap had moved, which may indicate a captured animal, wherein a wireless signal is then sent to a non-dedicated off-site receiver.

US 2004/0020100 discloses an alert system, in which a battery operated wireless radio frequency (RF) sensor/transmitter is incorporated with traps, such as live trap and spring loaded trap, along with a receiver configured to receive signals from the wireless RF transmitter.

U.S. Pat. No. 9,380,775 discloses a device powered by a long-life battery for monitoring and communicating the status of traps for vermin or pests. After an alarm is triggered, the device transmits a wireless communication to a server, which interprets the communication to determine the nature and origin of the alarm and send the communication to a user.

U.S. Pat. No. 8,418,396 discloses a humane animal trap having a trigger circuit coupled with an electronic sensor. The trigger circuit includes a detection circuit for determining the presence of an animal inside the trap. A wireless alert circuit may be coupled to the detector circuit to provide for remote signaling of an alarm unit when the animal trap has been tripped.

U.S. Pat. No. 6,775,946 discloses wireless transmitters in association with each of a plurality of animal traps and a central display unit, which receives signals from the traps and displays indicia of the state of the trap. When an animal takes the bait and springs the trap, the movable portion of the trap moves to catch the animal. The sensor will detect the movement of the movable member and, when controller next reads the sensor, a signal will be sent to the display unit to reflect the state change.

A need remains for a detection system that uses simple and inexpensive sensing technology, with minimal bandwidth and energy demands that is well adapted for high-volume, low-cost fields such as pest control and allow an operator to easily and accurately identify which of a plurality of animal traps needs to be tended to.

SUMMARY

In one aspect, the embodiments disclosed herein relate to an animal trap system including a glue board type animal trap upon which is attached to or otherwise in communication therewith, an animal trap accelerometer sensor, and a signal unit, generally in close proximity to the animal trap, in which the signal unit also contains or has attached thereto an accelerometer sensor. The animal trap sensor can be connected via wire or wirelessly connected to the signal unit, such that each accelerometer may act independently. Therefore, when accelerations are received above a pre-set threshold value by either the animal trap accelerometer sensor or the signal unit's accelerometer sensor, differential signal analysis may be performed and a signal generated, which may be a move, capture, and/or non-capture event and sent to the signal unit which transmits a signal to an off-site receiver.

In another aspect, any type of accelerometer sensor can be used such as an adjustable vibration sensor, a standard accelerometer, and/or a vibration sensor made of a simple ball in a tube, triggering when the ball rolls around. The accelerometer sensor may be one of any kind of sensor that measures accelerations or vibrations including accelerometers with or without built-in microprocessors, an adjustable ball tilt vibration sensor, and/or a single ball tilt vibration sensor.

In another aspect, the embodiments disclosed herein relate to an animal trap system including a glue board type animal trap upon which has connected thereto or in communication therewith an animal trap accelerometer sensor such that an animal(s) stepping on the animal trap will cause enough movement to displace the sensor in such a way that the acceleration exceeds a pre-set acceleration threshold value. The sensor is adapted to provide a move signal, causing the signal unit to transmit a signal to the off-site receiver.

In another aspect, the embodiments disclosed herein relate to an animal trap sensor including a test mode control mechanism for initiating a test mode, in which, when the test mode is initiated, if the off-site receiver receives the signal to register a capture event, this indicates that the animal sensor may be operational, and if the off-site receiver does not receive the signal, this indicates that the animal sensor may not be operational.

In another aspect, the embodiments disclosed herein relate to an animal trap sensor including an accelerometer that measures acceleration in one or more axes of the sensor such that, when the acceleration exceeds a pre-set acceleration threshold value, the sensor is adapted to provide a move signal to the off-site receiver, indicating that the sensor has been moved by other than a trapped animal and may not be operational or in the desired location.

In another aspect, the embodiments disclosed herein relate to a method of trapping an animal including providing an animal trap, disposing the animal trap sensor unto the animal trap, in which the animal trap sensor includes an accelerometer sensor, and a signal unit containing another accelerometer sensor, wherein an acceleration is received by the animal trap accelerometer sensor, above a pre-set threshold value, and an acceleration is not received or it received of less acceleration than that in the animal sensor, by the accelerometer in the signal unit, causing a capture event signal to be generated and sent to the signal unit, wherein the signal unit transmits a signal to an off-site receiver to register a capture event.

In another aspect, the embodiments disclosed herein relate to a method of trapping one or more animals including optionally initiating a test mode and sending a signal to the off-site receiver, in which, when the test mode is initiated, the off-site receiver receives the signal to register a capture event, indicating that the animal sensor may be operational; or if the off-site receiver does not receive the signal, indicating that the animal sensor may not be operational.

In another aspect, the embodiments disclosed herein relate to use of the animal trap for registering a capture event of an animal(s) in a trap, in which the animal trap sensor may include a test mode control mechanism for initiating a test mode, in which, when the test mode is initiated, if the off-site receiver receives the signal to register a capture event, this indicates that the animal sensor may be operational; and if the off-site receiver does not receive the signal, indicating that the animal sensor may not be operational.

In another aspect, the embodiments disclosed herein relate to use of the animal trap for registering a capture event of an animal(s) in a trap, in which the animal trap sensor may include an accelerometer that measures acceleration in one or more axes of the sensor such that, when the acceleration exceeds a pre-set acceleration threshold value, the sensor is adapted to provide a move signal to the off-site receiver, indicating that the sensor has been moved by other than a trapped animal(s) and may not be operational.

In another aspect, the embodiments disclosed herein relate to the use of the animal trap system for registering a capture event of an animal(s) present on a glue board animal trap, in which the animal trap sensor includes an accelerometer sensor, a signal unit that also includes an accelerometer sensor, either or both accelerometer sensors measures an acceleration in one or more axes of the sensor, such that, when the acceleration exceeds a pre-set acceleration threshold value for the animal trap accelerometer sensor only and the accelerometer in the signal unit does not receive an acceleration that exceeds a pre-set acceleration threshold value, thereby indicating an animal is trapped, the animal trap accelerometer sensor is adapted to provide a move signal, causing the signal unit to transmit a signal to the off-site receiver.

Other aspects and advantages of the invention will be apparent from the following description and the appended claims.

DETAILED DESCRIPTION

Animal traps are frequently placed in many locations, for example, in or near a building or house, and then moved about as needs arise elsewhere. The present invention provides a system that allows for wireless reporting of the status of animal traps, for instance, in remote hard to monitor locations, e.g., in an attic in a house.

Embodiments of the present invention include an animal trap system, e.g. a glue board animal trap, an accelerometer affixed to the glue board, and a signal unit also containing an accelerometer, for detecting the presence of animals in traps. For example, accelerometer sensors may provide signals based on accelerations above pre-set acceleration threshold values that could indicate different events. When an animal(s) directly steps on the glue board trap with the attached accelerometer, the animal triggers the accelerometer sensor by moving the glue board trap causing communication signals to be distributed through a wireless network to register a capture event. One or more animals can be trapped by the current system. Animals that can be trapped include animals that may be undesired in their current location, such as racoons, squirrels, possums, rats, mice, moles, hamsters and other rodents. Also, reptiles such as snakes and lizards can be captured. Also, the traps can be used to capture insects or arachnids, such as spiders.

Figure 1:
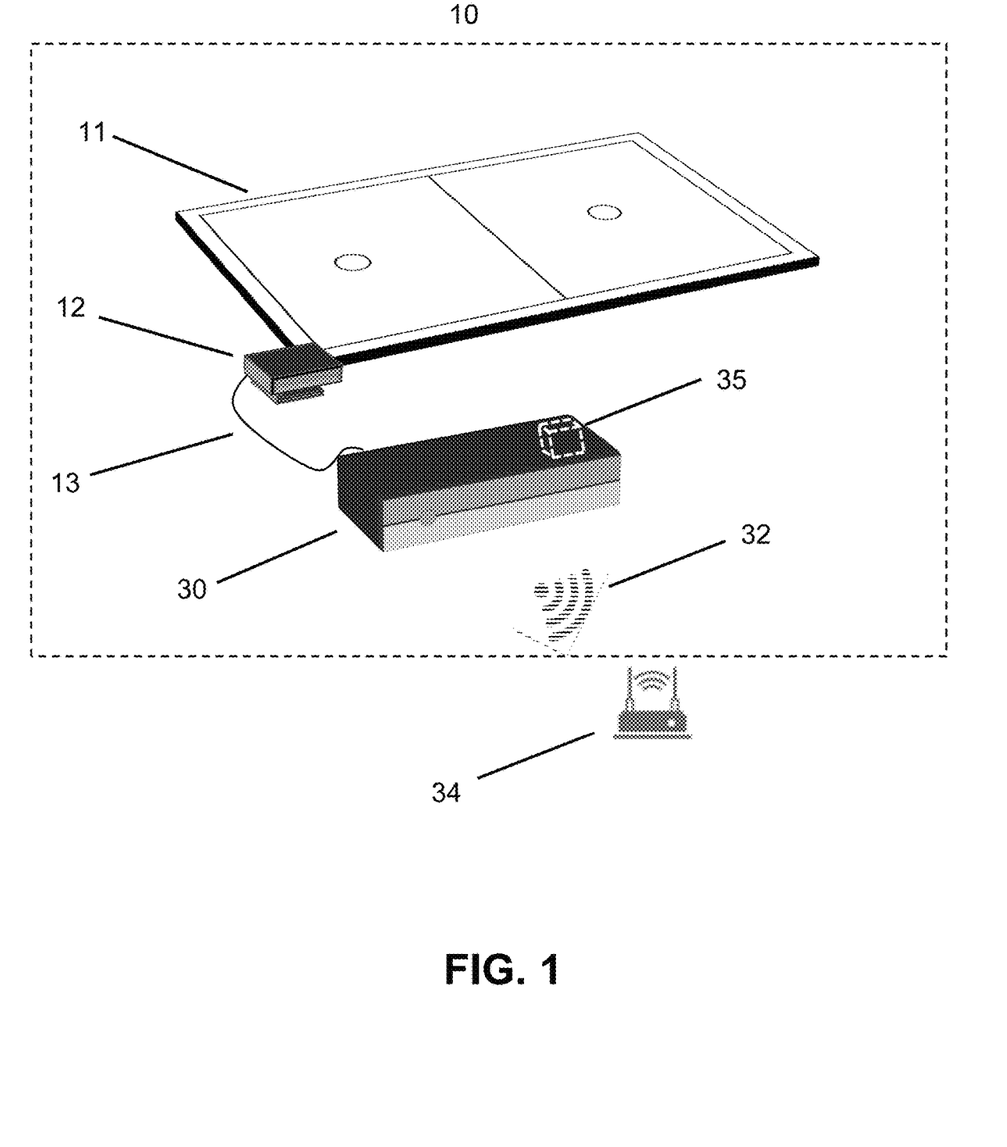
FIG. 1 shows an animal trap system in accordance with an embodiment of the present invention.

FIG. 1 shows an animal trap system 10 in accordance with an embodiment of the invention. The animal trap system 10 includes a glue board trap 11, an accelerometer sensor 12 attached to the glue board, a communications cable 13 connecting the accelerometer 12 to a signal unit 30, which has an accelerometer mounted inside, 35 and the signal unit 30 (see FIG. 3) having transmitters and batteries, which are used to power transmission of signals 32 to an off-site receiver 34. In certain embodiments, besides or in addition to batteries, short range and high power consumption technologies, such as Wi-Fi, Bluetooth and ZigBee, could be used. But preferably signal unit 30 may use Low Power Wide Area (LPWA) technologies, such as Ultra-narrowband (e.g., Sigfox), Spread-spectrum (e.g., LoRa) or Narrowband (e.g., Weightless-P) technologies that allow longer range communication and consume less power.

The glue board trap 11 may be any one of an adhesive type trap for small animals and/or rodents. The adhesive may be natural or synthetic and may applied to any one of a metal, plastic, cardboard, or similar material, for example, in a flat or tray like structure which may also include bait and/or a scent agent that attracts the small animal and/or rodents. The glue board trap can be a plastic tray full of glue or a piece of paper or cardboard or other substrate with adhesive to capture animals. The trap can be a flat and not enclosed. Or the trap can be an enclosed device, for example, made of cardboard, including adhesive on one or more sides. A glue board trap is any trap that can capture small animals that includes an adhesive to which the animals stick and are captured. The trap can include one or more glue boards.

The accelerometer 12 attached to the glue board and the accelerometer located in the signal unit 30 are able to each have pre-set threshold values configured and are able to act independently from one another. This allows for independent signals to be generated by the accelerometers wherein differential signal analysis may be performed to provide a more accurate event analysis resulting in less false positives. An example of this may occur when both accelerometers receive approximately the same accelerations could indicate a false positive where some external factor, such as the device as a whole being moved by person, or an external factor, such an earthquake moves both accelerometers together. Another alternative where differential signal analysis provides a more accurate event is when the accelerometer attached to the glue board trap receives an acceleration above a pre-set value threshold and the accelerometer located in the signal unit does not receive any acceleration above a pre-set threshold value which is indicative of a capture event. In further embodiments machine learning may be applied to the incoming signals to enhance basic events (capture/non-capture/false positives), and also provide indication of what type of animal (for example, mouse, rate, hamster, or mole) is captured. Furthermore, the differential signal analysis may occur on-site, for example, using the computational power of the signal unit or off-site at a backend server, if needed. In an embodiment, a processing unit configured to receive the independent signal responses from either accelerometer sensor via the off-site receiver 34. The processing unit is configured to perform a differential signal analysis.

In a further embodiment, the animal trap system comprises an output unit.

In another embodiment, the processing unit is configured to perform a differential signal analysis to identify a non-capture event when a move signal is created by both the accelerometer in the animal trap sensor and the accelerometer in the signal unit within 10 seconds of each other and wherein the output unit is configured to output the non-capture event.

In a further embodiment, the processing unit is configured to perform a differential signal analysis to identify a capture event when a move signal is created by the accelerometer in the animal trap sensor only and wherein the output unit is configured to output the capture event.

Figure 2:
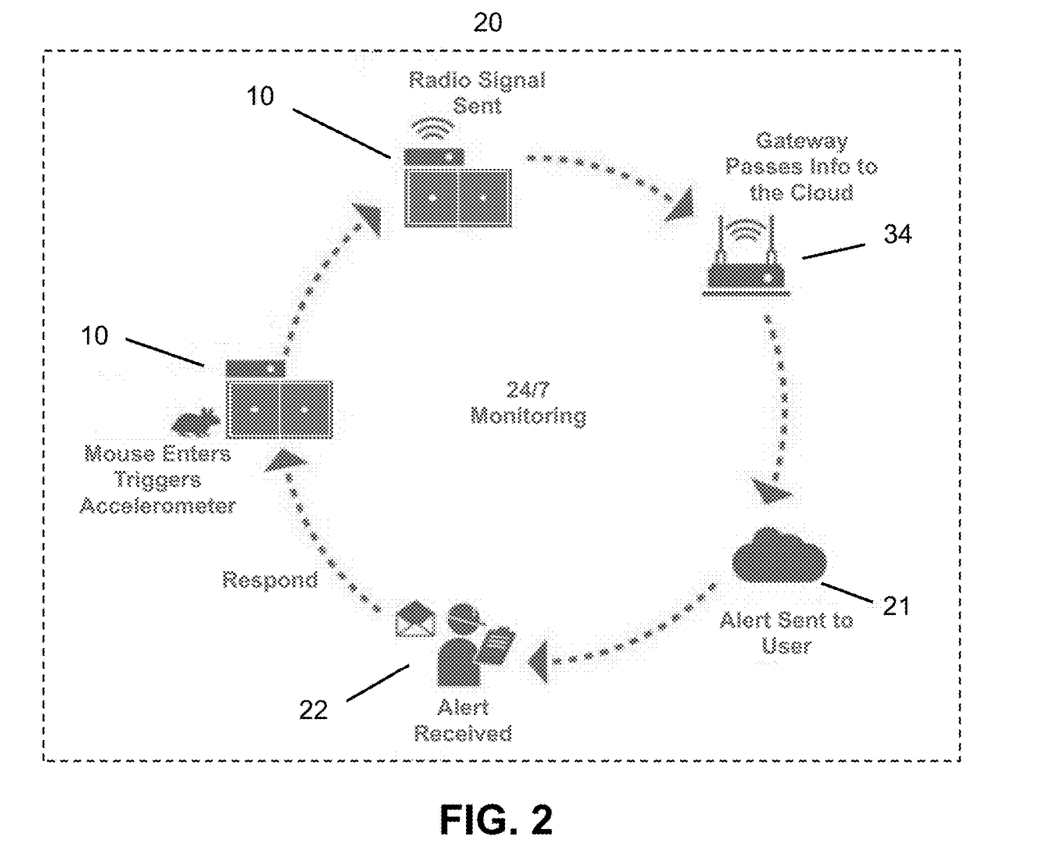
FIG. 2 shows an animal trap method in accordance with another embodiment of the present invention.

FIG. 2 shows animal trap method 20 in accordance with another embodiment of the present invention. An animal(s) steps onto the glue board and proceeds to create accelerations above a pre-set threshold value sensed by the accelerometer 12 (shown in FIG. 1) attached to the glue board. This creates a move signal for the signal unit which then generates radio signals broadcasting the status of the animal trap system. Once the off-site receiver 34 receives the signals broadcasted from the signal unit, the signals are then transmitted to the cloud 21 via cellular communication. In real-time, the cloud which comprises at least one processing unit processes the signaled event and performs any analysis, including differential signal analysis and generates an alert 22 to be sent to the user and e.g. shown to the user via an output unit such as a monitor, printer or speaker etc. The cloud software can send real-time notifications to users, such as by email or text message. Once the user receives the alert, they can then respond to the event (such as an event indicating a mouse has been trapped) and take appropriate actions based on the type of alert received. The system can automatically send real time capture alerts and regular system status reports, such as daily heartbeat messages (for example, to confirm the system is still operating or that the power is still on), movement detection, and battery level, thereby providing real-time rodent monitoring and improved audit readiness.

Figure 3:
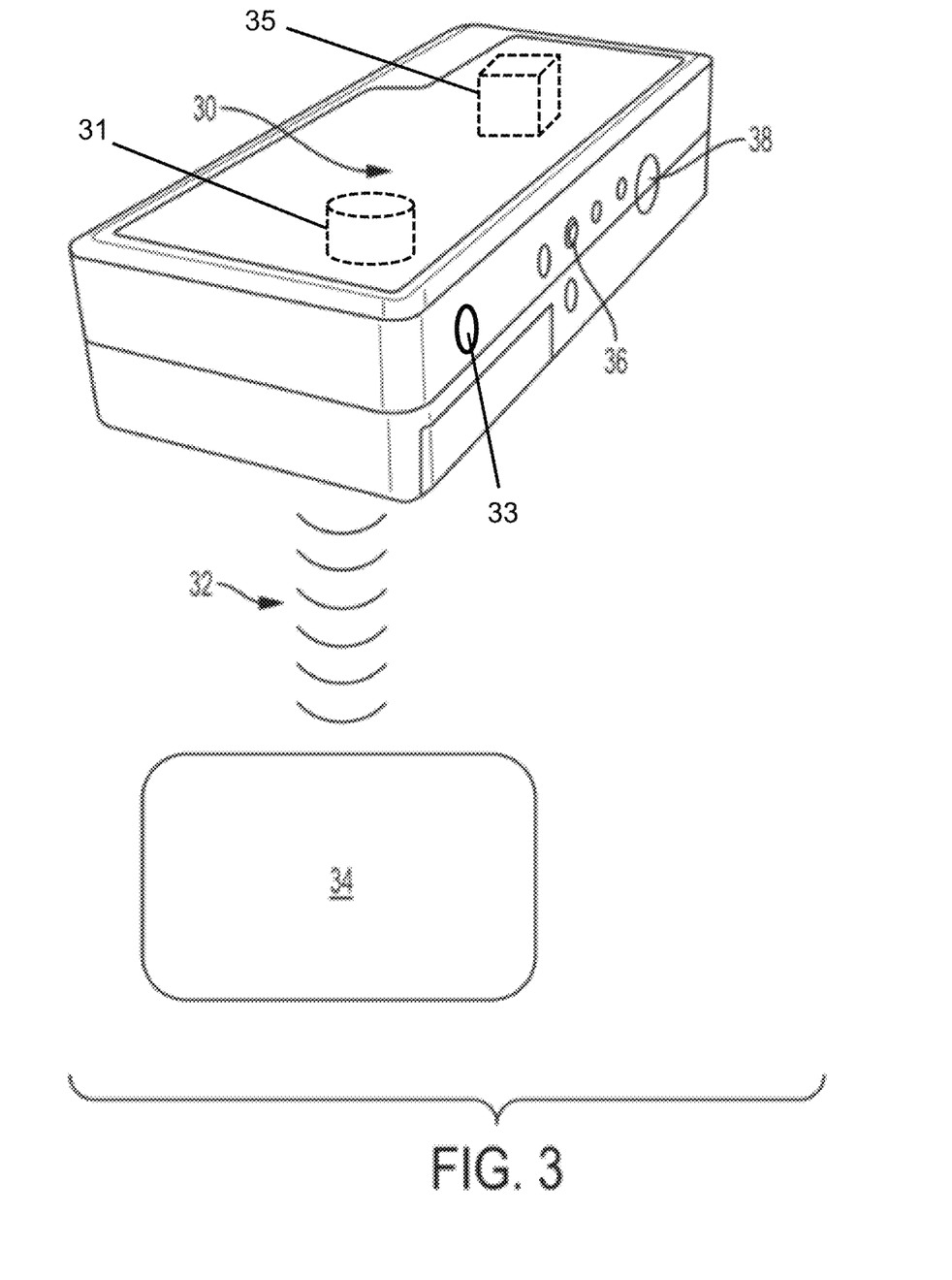
FIG. 3 shows an animal trap sensor in accordance with an embodiment of the present invention.

FIG. 3 shows animal trap system's signal unit in accordance with an embodiment of the present invention. The animal trap sensor 12 is connected with signal unit 30 by plugging a low voltage communication cable 13 of animal trap sensor 12 into data cable receptacle 36 of signal unit 30. Signal unit 30 may have reset switch 38 for resetting signal unit 30, alternatively the reset can be achieved remotely. When the animal trap sensor 12 generates a move signal based on receiving accelerations above a pre-set threshold value, the signal unit receives that signal and if the signal unit did not receive a similar signal from its accelerometer within a specified time, then the signal unit 30 transmits signal 32 to off-site receiver 34 to register or report a capture event.

FIG. 3 shows that signal unit 30 may include a test mode control mechanism 31 for initiating a test mode using test mode button 33. When triggering test mode, e.g., by depressing test mode button 33 or similar element, e.g., reset switch 38, on the side of the signal unit 30 or during set up or during routine maintenance, this may send a test mode signal via signal unit 30. Test mode button 33 and reset switch 38 may be the same unique button for initiating test mode and reset. Test signal may be processed and segregated from historical data so that test signal may not count as a capture event to indicate an actual animal capture. For example, when a test mode is initiated and the accelerometer sensor 12 is triggered, i.e., receives an acceleration above a pre-set threshold value, if off-site receiver 34 receives signal 32 to register a capture event, this may indicate that animal sensor 12 from "end-to-end" including from sensor 12 to cloud computation, e.g., transmitting wireless signal 32 and registering signal 32 in off-site receiver 34, are operational. On the other hand, if off-site receiver 34 does not receive a signal 32, this may indicate that the animal trap system including from sensor 12 to cloud computation, e.g., transmitting wireless signal 32 and registering signal 32, are not operational. Thus, test mode operation may allow operators to identify potential problems and resolve them to ensure sensor 12 and/or signal unit 30 are operational when setting up sensor 12 on the animal trap. Each attempt to resolve problems may be checked by activating the accelerometer sensor 12 in test mode. For example, successful resolution of problems may be indicated by off-site receiver 34 receiving signal 32 to register a capture event. This capture event may be flagged as "in test mode," so that off-site receiver 34 may not count this registered capture event "in test mode" as a real capture event, e.g., to be used in trend analysis for predicting future capture events.

FIG. 3 shows that signal unit 30 may include accelerometer 35 that measures acceleration in one or more axes of signal unit 30, e.g., two- or three-axis accelerometer. If sensor 12 and/or signal unit 30 is jostled or moved, accelerometer 35 may detect rapid movement that causes acceleration to exceed a pre-set acceleration threshold value. Sensor 12 and/or signal unit 30 may subsequently provide a move signal to off-site receiver 34 to indicate sensor 12 and/or signal unit 30 may have been unintentionally and intentionally moved by other than an animal, and, thus, may not be operational. In other words, move signal can be used to alert a user that the trap might not be in a good operating conditions anymore, e.g., moved from the desired location, e.g. not adjacent to a wall anymore, but in the middle of room. In addition, when off-site receiver 34 receives both move signal and capture signal within temporal proximity, e.g., within 1 second, 2 seconds, 5 seconds, or 10 seconds, between each other, the registered capture event may be treated as a false positive. Off-site receiver 34 may not count this false positive as a real capture for the purpose of trending capture event because sensor 12 and/or signal unit 30 was just moved or jostled and was not really triggered by animals so that no capture data would be recorded. This prevents users from receiving errant capture messages which would otherwise cause users to check the trap for any captured animals, saving a significant amount of time. Test mode control mechanism 31 and accelerometer 35 may be disposed together in the same signal unit 30. Alternatively, test mode control mechanism 31 and accelerometer 35 may be disposed separately in different signal units and/or sensors.

Embodiments of the present invention also include animal trap systems containing animal traps and animal trap sensors for monitoring trap status.

Figure 4:
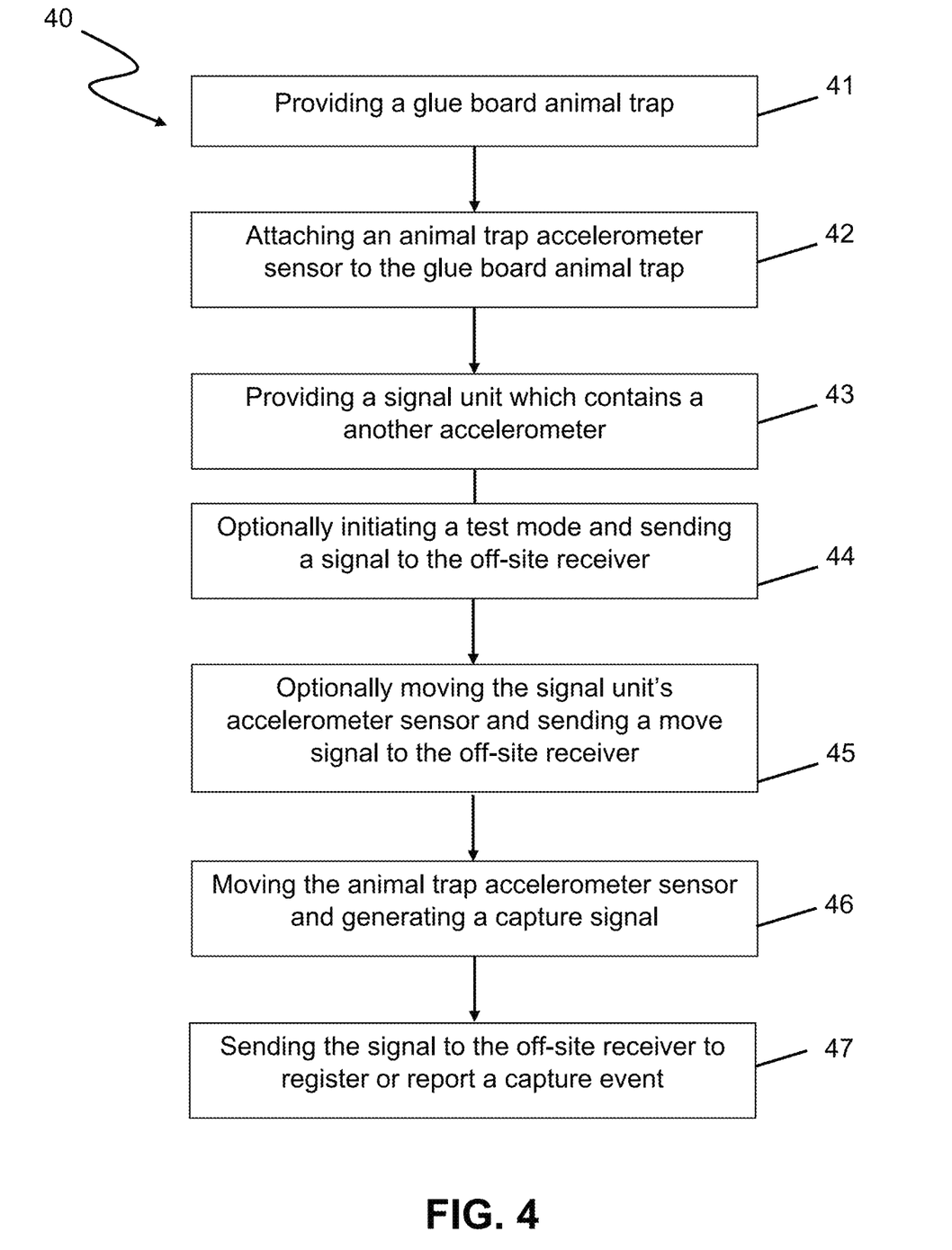
FIG. 4 shows a method in accordance with an embodiment of the present invention.

FIG. 4 shows a method 40 for trapping animals including providing animal trap (41), e.g., glue board trap; attaching animal trap accelerometer sensor onto animal trap (42); providing a signal unit in close proximity to and in communication with the animal trap sensor containing another accelerometer (43); optionally initiating a test mode and sending a signal to the off-site receiver (44), in which, when the test mode is initiated, if the off-site receiver receives the signal to register a capture event, this indicates that the animal sensor is operational, on the other hand, if off-site receiver does not receive the signal, this may indicate that the animal sensor is not operational; optionally moving the signal unit's accelerometer sensor and sending a move signal to the off-site receiver (45), the move signal may indicate the signal unit was moved and, thus, may not be operational; moving the animal trap accelerometer sensor above a pre-set threshold value, thereby generating a move signal (46), which may be a confirmed capture event, if the accelerometer sensor in the signal unit does not receive an acceleration above a pre-set threshold value; and sending signals to off-site receiver to register or report a capture event (47). Capture event registered in the test mode may be segregated from real capture event and not be counted in historical capture events or may not be used in trend analysis for predicting future capture events. Initiating a test mode (44) may be performed at setting up trap or during performing a maintenance of the trap. In addition, when the off-site receiver receives the move signal from the signal unit and the capture signal within temporal proximity, e.g., within 1 second, 2 seconds, 5 seconds, or 10 seconds, between each other, the registered capture event may be treated as a false positive. Such methods for transmitting signals to off-site receiver may also be applicable to registering and measuring frequency of capture events.

Figure 5:
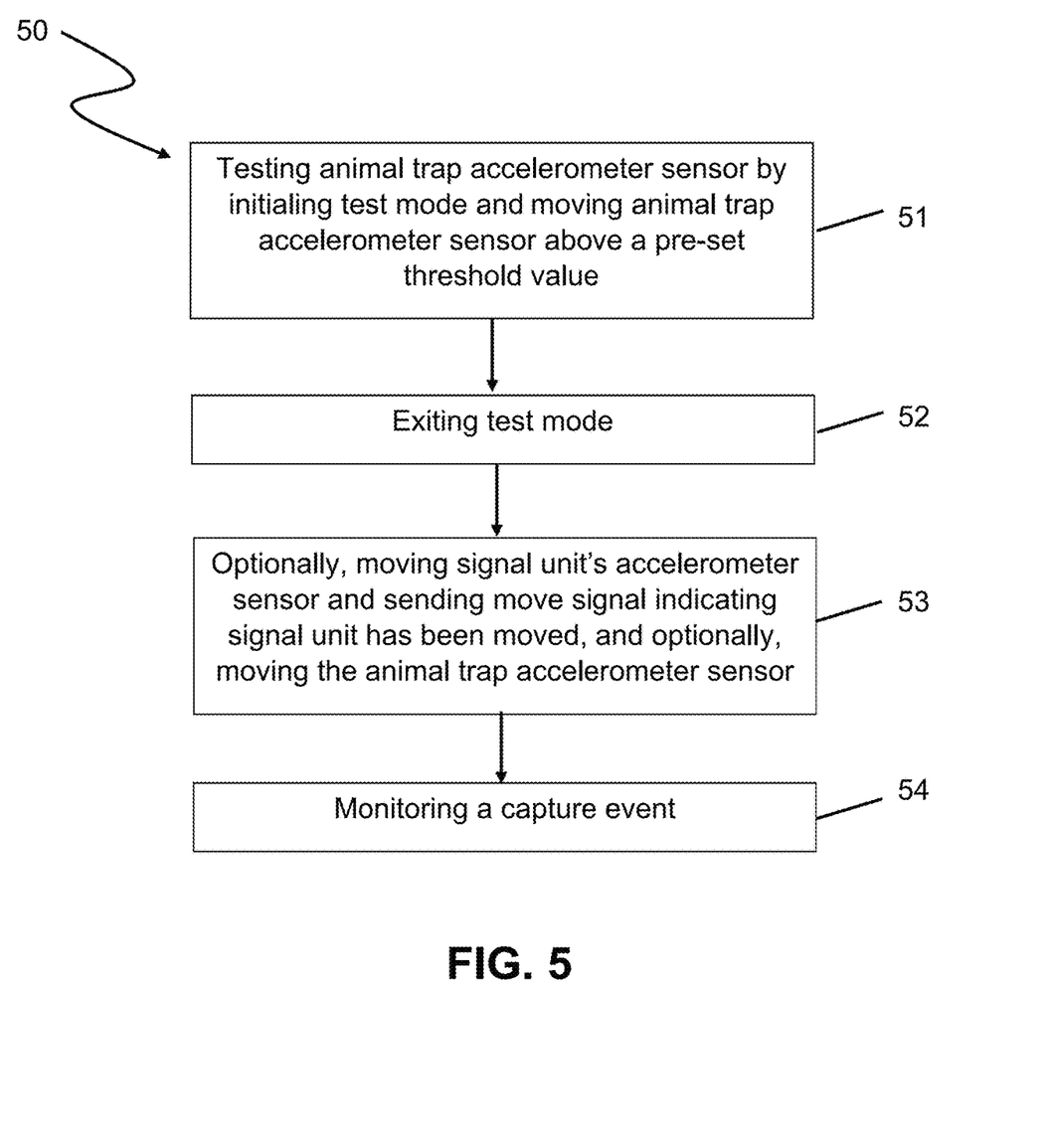
FIG. 5 shows a method in accordance with another embodiment of the present invention.

FIG. 5 shows a method 50 of monitoring an animal trap system using sensor in accordance with some embodiments of the invention may include steps of testing sensor (51), which may include initialing test mode and moving animal trap accelerometer sensor above a pre-set threshold value, if off-site receiver receives signal to register a capture event, this indicates that animal sensor is operational, and if off-site receiver does not receive the signal, this indicates that animal sensor may not be operational; exiting test mode (52), optionally moving the signal unit's accelerometer sensor and sending move signal indicating the signal unit has been moved, e.g., moved from the desired location, e.g. wire disconnected from animal trap accelerometer sensor and optionally, moving the animal trap accelerometer sensor (53), and monitoring a capture event (54). If the off-site receiver receives move signal and signal to register a capture event within 10 seconds between each other, the signal (to register a capture event) is registered as a false positive. The capture event registered in the test mode may not be counted as a capture event in a trend analysis for predicting future capture event. Initiating test mode (51) may be at setting up the trap or at performing a maintenance of the trap. In an embodiment, the outcome of the differential signal analysis is shown to a user e.g. via an output unit such as a monitor, printer, speaker, etc.

Advantages of the present invention may include a glue board animal trap system that provides additional insights to registered events by using differential signal analysis by providing two accelerometers, e.g. one attached to the glue board and the other located in the signal unit.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:
1. An animal trap system comprising
an animal trap that includes a glue board,
an animal trap sensor affixed to or in communication with the animal trap,
wherein the animal trap sensor is an accelerometer sensor, and
a signal unit in proximity to and in communication with the animal trap sensor,
wherein the signal unit contains an accelerometer sensor, and
wherein the animal trap sensor is affixed to the glue board and connects to the signal unit via a wired connection such that the animal trap sensor and the accelerometer sensor located in the signal unit produce independent signal responses.
2. The animal trap system of claim 1, wherein either or both of the accelerometer sensors measure acceleration in one or more axes of the sensor such that, when the acceleration exceeds a pre-set acceleration threshold value, the sensor is adapted to provide a move signal, causing the signal unit to transmit a signal to an off-site receiver.
3. The animal trap system of claim 1, wherein either or both accelerometer sensors are two- or three-axis accelerometer.

4. The animal trap system of claim 1, wherein the independent signal responses from either accelerometer sensor allows differential signal analysis.

5. The animal trap system of claim 4, wherein the differential signal analysis may be used to indicate parameters, such as, capture signals, move signals, false positives, and/or the type of animal captured.

6. The animal trap system of claim 1, wherein the animal trap system further comprises a processing unit configured to receive the independent signal responses from either accelerometer sensor via the off-site receiver and wherein the processing unit is further configured to perform a differential signal analysis.

7. The animal trap system of claim 6, wherein the animal trap system further comprises an output unit.

8. The animal trap system of claim 7, wherein the processing unit is configured to perform a differential signal analysis to identify a non-capture event when a move signal is created by both the accelerometer in the animal trap sensor and the accelerometer in the signal unit within 10 seconds of each other and wherein the output unit is configured to output the non-capture event.

9. The animal trap system of claim 7, wherein the processing unit is configured to perform a differential signal analysis to identify a capture event when a move signal is created by the accelerometer in the animal trap sensor only and wherein the output unit is configured to output the capture event.

10. A method of monitoring an animal trap system comprises
providing an animal trap system according to claim 1,
setting the animal trap sensor to a pre-set acceleration threshold value,
setting the signal unit's accelerometer to a pre-set acceleration threshold value,
upon an acceleration reaching the pre-set threshold value of the animal trap sensor and/or the signal unit's accelerometer sensor, create one or more move signals,
transmitting the signal to an off-site receiver, and
upon receiving the one or more move signals from either the accelerometer in the animal trap sensor and/or the accelerometer in the signal unit, perform differential signal analysis to identify an outcome.

11. The method of claim 10, wherein the differential signal analysis provides a non-capture event when a move signal is created by both the accelerometer in the animal trap sensor and the accelerometer in the signal unit within 10 seconds of each other.

12. The method of claim 10, wherein the differential signal analysis provides a capture event when a move signal is provided by the accelerometer in the animal trap sensor only.

13. The method of claim 10, wherein the outcome of the differential signal analysis is shown to a user.

* * * * *